US012699790B2

(12) United States Patent
Li et al.

(10) Patent No.: US 12,699,790 B2
(45) Date of Patent: Aug. 4, 2026

(54) SYSTEM AND METHOD OF PROVIDING GRANULAR ACCESS CONTROL

(71) Applicant: Microsoft Technology Licensing, LLC, Redmond, WA (US)

(72) Inventors: Mengke Li, Bellevue, WA (US); Samuel Mberere Kabue, Seattle, WA (US); John Matthew Mangino, Seattle, WA (US); David Minasyan, Bothell, WA (US); Trent Der Green, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 354 days.

(21) Appl. No.: 17/525,490

(22) Filed: Nov. 12, 2021

(65) Prior Publication Data
US 2023/0153449 A1    May 18, 2023

(51) Int. Cl.
*G06F 21/62*        (2013.01)
*G06F 21/60*        (2013.01)

(52) U.S. Cl.
CPC ........ *G06F 21/6218* (2013.01); *G06F 21/604* (2013.01); *G06F 2221/2141* (2013.01)

(58) Field of Classification Search
CPC ............. G06F 2221/2141; G06F 21/62; G06F 21/6218; G06F 21/60; H04L 63/10; H04L 63/101; H04L 63/102; H04L 63/105; H04L 63/0823; H04L 63/08; H04L 63/0807; H04L 9/3213
See application file for complete search history.

(56) References Cited

U.S. PATENT DOCUMENTS

| | | | | |
|---|---|---|---|---|
| 9,774,586 B1* | 9/2017 | Roche | ...................... | H04L 63/08 |
| 2017/0099293 A1* | 4/2017 | Tan | ........................ | H04L 67/535 |
| 2017/0331832 A1 | 11/2017 | Lander et al. | | |
| 2017/0359346 A1* | 12/2017 | Parab | ...................... | H04L 67/02 |

(Continued)

OTHER PUBLICATIONS

Lyon, et al., "Azure AD built-in roles", Retrieved from: https://docs.microsoft.com/en-us/azure/active-directory/roles/permissions-reference#global-administrator, Dec. 10, 2021, 150 Pages.

(Continued)

*Primary Examiner* — Beemnet W Dada
*Assistant Examiner* — Sayeda Salma Nahar
(74) *Attorney, Agent, or Firm* — William C. Powell; Newport IP, LLC

(57)        ABSTRACT

A system and method for providing delegated access control to a resource is provided. The method includes receiving a request to access the resource, where the request includes an access token and identifying a task to be performed on the resource. The access token identifies an access role associated with the user who makes the request. After receiving the request, a role-to-permissions map is used to identify permissions available for the access role. Based on the available permissions for the access role, it is determined whether the user is authorized to perform the task on the resource. When it is determined that the user is authorized to perform the task on the resource and the user has permission to access the resource managed by an object model, the user device of the user is permitted to access the resource to perform the task.

20 Claims, 8 Drawing Sheets

(56)               References Cited

U.S. PATENT DOCUMENTS

| | | | |
|---|---|---|---|
| 2022/0006801 A1* | 1/2022 | Jankowski | H04L 63/0807 |
| 2022/0342997 A1* | 10/2022 | Watanabe | G06F 21/577 |

OTHER PUBLICATIONS

"International Search Report and Written Opinion Issued in PCT Application No. PCT/US22/042412", Mailed Date: Nov. 23, 2022, 11 Pages.

Communication pursuant to Article 94(3) Received in European Patent Application No. 22778129.1, mailed on Mar. 24, 2026, 07 pages.

\* cited by examiner

Request

Request Attributes:
Time of Day
Device IP Address
Requested Action to be performed on secured resource
Other request attributes

305

Token

Claims
Group Memberships
User Attributes
WID

310

SYSTEM AND METHOD OF PROVIDING GRANULAR ACCESS CONTROL

BACKGROUND

With the increased use of cloud-based services such as cloud-based storage, organization, content management, collaboration and the like, managing access to various resources is becoming more and more complex. Often customers of a cloud-based service desire to grant specific types of access to particular individuals. These include individuals with the need to have access to a broad range of actions and/or resources. These users may be given administer access privileges. These administrator access privileges are often high-powered privileges that grant access to many resources and actions. However, not all administrator users have the need or the authority to gain access to all or many of an organization's resources. For example, an administrator may only need to have access to a portion of the organization's resources. Furthermore, an organization may at times need to grant administrative access to external users. Access to such users, however, may need to be limited to ensure the external users are restricted in their use of the organization's resources and reduce security exposures. However, current cloud-based access control mechanisms provide a limited number of access control roles, and these roles are often provided at a global level for an organization. If compromised, these access control roles can result in significant security risks for the organization. As the number of users and/or the amount of content used or managed by an organization increases and/or the users of the organization change roles, it may become increasingly difficult to manage access permissions in a secure and efficient manner.

Hence, there is a need for an improved method and system providing granular access control.

SUMMARY

In one general aspect, the instant disclosure presents a data processing system having a processor and a memory in communication with the processor where the memory comprises executable instructions that, when executed by the processors, cause the data processing system to perform multiple functions. The functions may include receiving, from a user's device, a request to access a resource and an access token, the access token identifying an access role associated with a user and the request identifying a task to be performed on the resource, retrieving the access role from the access token, examining a role-to-permissions map to identify one or more permissions available for the access role, determining, based on the available one or more permissions for the access role that the user is authorized to perform the task on the resource, determining, based on the access role and the available one or more permissions, that the user has permission to access the resource managed by an object model, and upon determining that the user is authorized to perform the task on the resource and that the user has permission to access the resource managed by the object model, permitting the user's device to access the resource to perform the task.

In yet another general aspect, the instant disclosure describes a method for providing access to a resource. The method may include receiving, from a user's device, a request to access the resource and an access token, the access token identifying an access role associated with a user and the request identifying a task to be performed on the resource, retrieving the access role from the access token, examining a role-to-permissions map to identify one or more permissions available for the access role, determining, based on the available one or more permissions for the access role that the user is authorized to perform the task on the resource, determining, based on the access role and the available one or more permissions, that the user has permission to access the resource managed by an object model, and upon determining that the user is authorized to perform the task on the resource and that the user has permission to access the resource managed by the object model, permitting the user's device to access the resource to perform the task.

In a further general aspect, the instant disclosure describes a non-transitory computer readable medium on which are stored instructions that when executed cause a programmable device to perform functions of receiving, from a user's device, a request to access a resource and an access token, the access token identifying an access role associated with a user and the request identifying a task to be performed on the resource, retrieving the access role from the access token, examining a role-to-permissions map to identify one or more permissions available for the access role, determining, based on the available one or more permissions for the access role that the user is authorized to perform the task on the resource, determining, based on the access role and the available one or more permissions, that the user has permission to access the resource managed by an object model, and upon determining that the user is authorized to perform the task on the resource and that the user has permission to access the resource managed by the object model, permitting the user's device to access the resource to perform the task.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
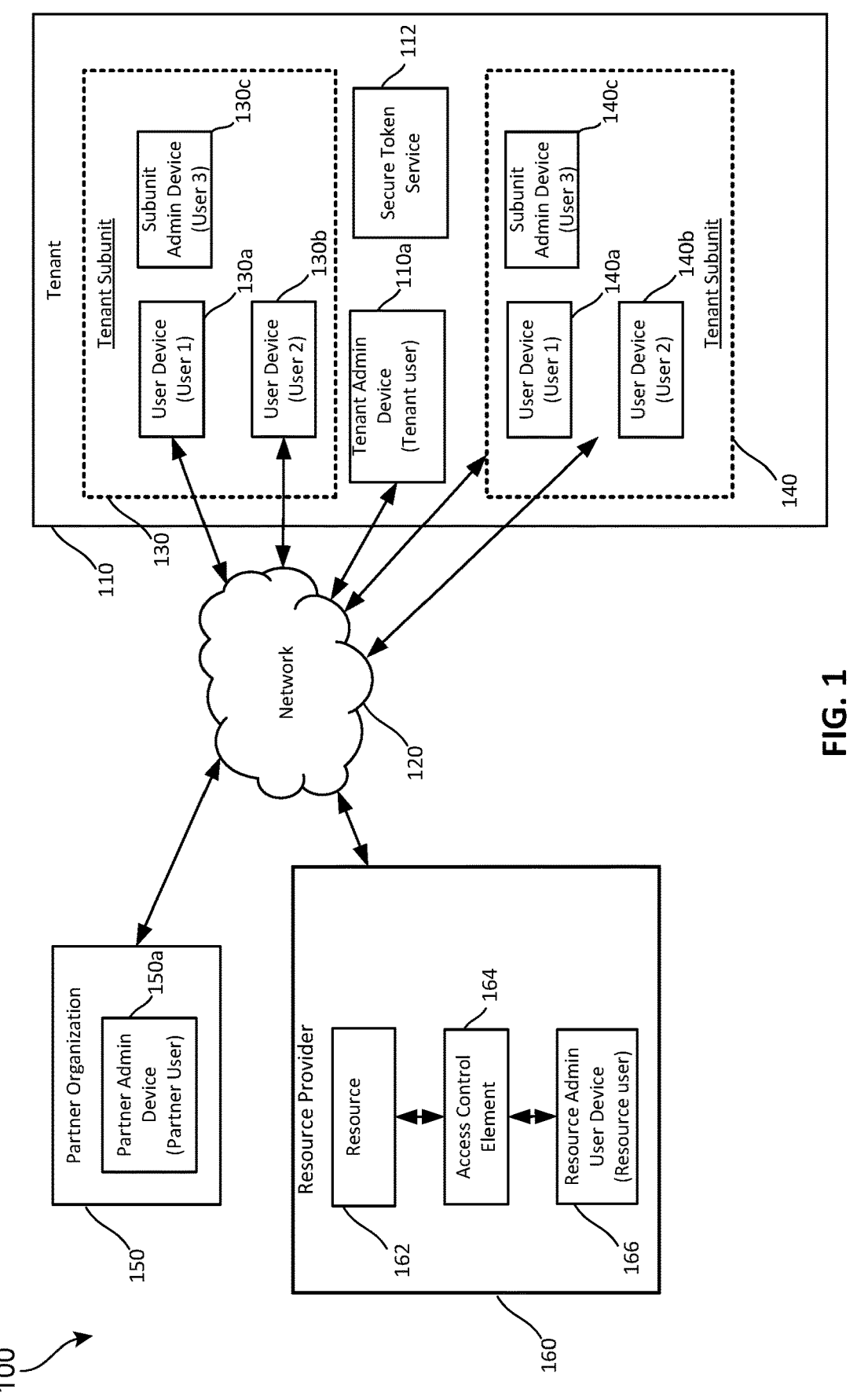
FIG. 1 is a diagram showing an example computing environment upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

In today's computing environments, many organizations make use of cloud-based computer services such as cloud-based storage and file management, cloud-based software services and the like. An example of cloud-based storage and services is Microsoft® SharePoint which helps organizations share and manage content, knowledge and applications. Organizations often designate one or more users as administrators for managing their computer systems, software services, and file management systems. These users are often granted administrator roles by the provider of the cloud services, so that they can access, manage and/or perform specific operations with respect to the organizations, services and/or resources. However, currently available administrator roles for cloud-based services are limited to very few restrictive roles. For example, an administrator may either have full access to all Create, Read, Update, Delete (CRUD) operations on all types of resources or only have read-only access to all the resources. These roles are limited in their ability to provide access to an organization's resources as needed, as they do not provide further granular control. Thus, there exists a technical problem of lack of granular permission control in currently available access control mechanisms of cloud-based services.

Large organizations often include many different departments, each of which may include their own resources, users, and the like. These organizations may desire to grant administrative role privileges to specific users for each of the different departments. Sometimes an administrator of one department should not be allowed to access or manage resources of another department. However, current administrator roles associated with an organization are often global roles that grant access to all of an organization's resources. This may increase security exposure for the organization and may lead to customer dissatisfaction. As such, there exits another technical problem of lack of efficient mechanisms for providing restrictive access to a segment of an organization's resources.

Moreover, existing mechanisms for determining whether a user has an administration role for an organization depends on the user's full permission to the organization's administration site. This strong dependence on the user's permission to the organization's administration site has many disadvantages. For example, checking the user's permission requires opening the organization's administration site. This increases the processing, bandwidth and memory footprint associated with the access control operations. Furthermore, this approach does not work when the site is read-only. That can happen during datacenter maintenance operations such as database upgrade, site/tenant move, and the like. During such times, the administrators may have only reader-like permissions, where they can only read, but not perform editing operations. Thus, there exists another technical problem of dependence of administrative roles on access to administration sites.

To address these technical problems and more, in an example, this description provides a technical solution for providing resource administrators with granular permission controls. This may be done by providing a granular access control framework that is designed to support various access types such as role-bound access control, resource-bound access control, time-bound access control, and task-bound access control. The granular access control framework may include a role-based access control manager, which may itself include a role-bootstrap module and an asset access module. The role-bootstrap module may identify the current user's role, the admin units to which the user belongs, and/or the tasks to which the user has access. The asset access module may in turn examine and authorize the access from the customer at the object model layer.

In the granular access control framework provided by the technical solution, a new role may be added by adding permission map entries. This provides an easy and efficient onboarding process for new roles through the use of descriptive permission maps. Moreover, the granular access control's features may be built such that they apply across all clients. This ensures there is reduced need for changing existing code to onboard existing functionality. This provides a significant advantage to existing access control mechanisms which often substantial code changes and engineering time for creating a new role or access control.

Additionally, the granular access control framework provided by the technical solution offers an efficient mechanism for adding new functionality. To add a new functionality to an existing permission map, a simple change in code (e.g., adding one line of code) may be needed. To add a new type of resource to manage, the change can combine the permission map as well as the new functionality update. Moreover, to add a new type of access control, the change can combine the permission control manager, permission map, as well as the new functionality update. Thus, the technical solution offers a very efficient access control mechanism that provides granular permission control, efficient onboarding process for new roles, features, resources, and types of access control.

As will be understood by persons of skill in the art upon reading this disclosure, benefits and advantages provided by such technical solutions can include, but are not limited to, a solution to the technical problems of inefficient, resource-intensive storage and high security risk access control mechanisms for cloud-based services. Technical solutions and implementations provided herein optimize and improve the process of providing granular access control that can easily accommodate new roles, features, resources, and types of access control. The benefits provided by these technical solutions include providing increased efficiency and security in managing access control, and as such can result in improvements in customer satisfaction.

As used herein, "access control" may refer to protection of a service or resource by controlling a user's ability to perform actions with respect to the service or resource. The term "customer" or "tenant" may refer to an organization having a plurality of computer users who utilize computer software programs acquired by the organization. The organization may be a small, medium size or large organization. The term "cloud-based service provider" or "resource provider" may refer to any organization that develops, offers for sale, sells, or licenses computer software programs and/or services such as cloud services.

FIG. 1 is a diagram showing an example computing environment upon which aspects of this disclosure may be implemented. The computing environment 100 may include a tenant 110, which may itself include a tenant subunit 130 and a tenant subunit 140. Each tenant subunit may include multiple user devices. For example, tenant subunit 130 may include user devices 130a and 130b and subunit admin device 130c. Tenant subunit 140, on the other hand, may include user devices 140a and 140b, and subunit admin device 140c. Each of the devices 110a, 130a-130c and 140a-140c may be associated with a unique user. Each tenant subunit may be a separate department or business unit within the tenant. In an example, the tenant is a school district, and each subunit represents one school within the school district.

The tenant 110 may include tenant admin device 110a, as well as multiple user devices (not shown). In the example of the school district, the school district may have a plurality of computer users that are not linked to a specific school but work for the school district as a whole. These users may fall directly within the tenant 110, while users within each school may fall under the specific tenant subunit to which the school belongs. The tenant admin device 110a may need to have access to administrative services and resources associated with the entire tenant 110. However, the tenant 110 may have a need for granting administrative access to a user within each subunit for resources that are specific to that subunit. This may be achieved by designating some user devices as subunit admin devices. Thus, tenant subunit 130 may include the subunit admin device 130c and tenant subunit 140 may include subunit admin device 140c. The subunit admin users may receive admin unit administrative privileges. In an example, these privileges are granted by limiting the permission scope of an administration role to an admin unit (e.g., limited to the tenant subunit to which the user belongs). That means the user may have full admin unit scoped permission on the resources provided for that tenant subunit. This provides resource-bound access control and enables a tenant to break down administration into smaller units based on the tenant's organizational structure or other parameters, such that management of specific day-to-day tasks can be decentralized.

The computing environment 100 may include a resource provider 160 which may provide access to a resource 162 to one or more tenants such as tenant 110. The resource 162 may be a secured resource that includes various types of resources, such as but not limited to a file management system, files and/or other content of a collaborative platform, a messaging system, online applications and services, and/or other types of resources that may be accessible to and/or manipulated by one or more users of the computing environment 100.

Access to the resource 162 may be provided via a network 120. The network 120 may be a wired or wireless network or a combination of wired and wireless networks and may include a plurality of networks. The resource provider 160 may manage how to provide access to the resource 162 by utilizing an access control element 164. The access control element may utilize a role-to-permission map and may handle Application Programming Interface (API) level authorization check and enforcements, as discussed in more detail below with respect to FIG. 2.

The resource provider 160 may include one or more resource admin user devices such as the resource admin user device 166. The resource admin user devices may be associated with a resource administrator who has an administrative role for managing one or more resources offered by the resource provider 160. The resource administrator may have global administrative roles that allow it access to global resources provided by the resource provider 160. In an example, the resource administrator may be able to utilize a user interface (UI) screen to access the resource 162 and may be able to manage permission roles and access privileges for tenants of the resource provider 160.

In some implementations, the resource provider 160 may work with a partner organization 150 to provide the resource 160. For example, the partner organization 150 may be a third-party organization that sells or otherwise provides access to the resource 162. As part of the sale, the partner organization 150 may be responsible for managing or maintaining the resource 162 for the tenant to whom it made the sale. For example, if the partner organization 150 provides the licensing rights to the tenant 110 for accessing the resource 162, the partner organization may be responsible to set up access to the resource 162 for the tenant 110.

In such a scenario, one or more devices of the partner organization 150, such as partner admin device 150a may need to be designated as partner admin devices such that the partner users associated with those devices can have access to the resource 162. This type of access may be time-bound such that the amount of time the partner admin device 150a has access to the resource 162 of tenant 110 is limited. This may be provided by designating the partner admin as having a Granular Delegated Admin Permission (GDAP).

GDAP is an access control feature which aims to provide secure and granular access for delegated administrator (e.g., admin on behalf of another entity) scenarios. This may be achieved by utilizing a partner center service (not shown) which provisions resources to the tenant and partner organization based on the lifecycle of the partnership between the tenant and partner organization. This partner center service may be included as part of an active directory of tenants. In the partner organization, access to tenant resource may be managed by an active directory security group. When the partner user signs into the customer tenant, the trust relationship between the partner user and the customer tenant may be established. This may be handled by a secure token service 112 in the tenant 110, using a cross-tenant access policy. The secure token service 112 may evaluate which groups in the partner user's organization are represented by group proxies in the tenant 110. The secure token service 112 may then issue a token to the partner user for accessing the resource 162 in the tenant 110. The token may include any directory roles for which the partner user is authorized.

Figure 2:
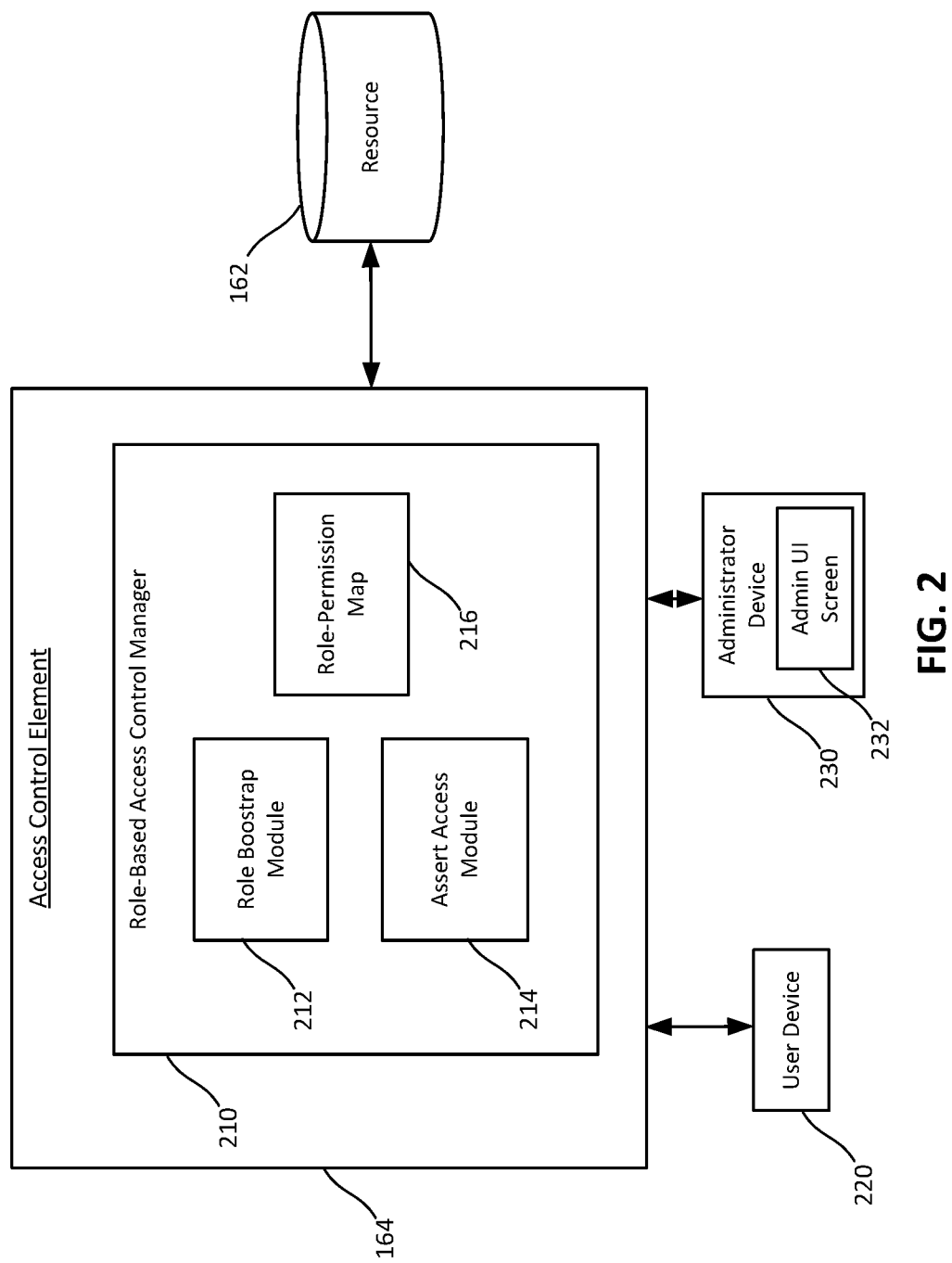
FIG. 2 is a diagram showing details of an access control framework.

FIG. 2 is a diagram showing details of an access control framework. An access control framework for a computer environment may include an access control element 164. In some implementations, the access control element 164 may include a role-based access control manager 210. The role-based access control manager 210 may be responsible for mapping existing admin roles as well as any GDAP roles to granular permissions for an administrator (e.g., tenant admin). This enables a tenant to assign access on a more granular level such that the tenant can manage their resources in a more secure manner.

Mapping admin roles to granular permissions may involve creating a role-to-permission map 216. The role-to-permission map 216 may be a map that provides a list of permissions available for each role. The possible permissions in the role-to-permission map 216 may include CRUD operations (e.g., Create, Read, Update, and Delete). The role-to-permission map 216 may include a permission-scope field for each role. The permission-scope field may be an optional field. For fields where the user has access to all of a resource, the scope may be all. For admin unit scenarios, however, the scope may be admin unit scoped. For task access control scenarios, the scope may task scoped. In some implementations, the role-to-permission map 216 is a static map that can be easily removed or changed. Adding a new role into the role-to-permission map 216 may require explicitly updating the role-to-permission map 216 by adding new permissions for the new role. Adding a new role, however, may not impact any existing APIs which reference the role-to-permission map 216. When a new API is needed, the new API may be created with permission authorization awareness. In some implementations, the API authorization check is generic such that when a new role-based access control manager 210 is built, the new role-based access control manager 210 can utilize the same interface and existing API authorization code. The new role-based access control manager 210 may be stored securely such that it can be compromised or changed by tenant at service level.

Table 1 depicts a few examples of user types that may be utilized in a role-to-permission map to designates specific permissions to different roles.

TABLE 1

| Role Type | Internal to tenant | Resource scoped | Role scoped | Times scoped | Task scoped |
|---|---|---|---|---|---|
| GDAP | No | Yes | Yes | Yes | No |
| Admin Unit | Yes | Yes | No | No | No |
| Global Admin | Yes | No | Yes | No | No |
| Global Reader | Yes | No | Yes | No | No |
| Resource Admin | Yes | Yes | No | No | No |
| Term store | Yes | No | Yes | No | No |
| Knowledge admin | Yes | No | Yes | No | No |
| Migration admin | Yes | No | Yes | No | No |
| Stream admin | Yes | No | Yes | No | No |
| Site admin | Yes | Yes | No | No | No |
| Knowledge manager admin | Yes | No | Yes | No | No |
| Storage Resource admin | Yes | No | Yes | No | No |
| Group admin | Yes | No | Yes | No | No |
| User admin | Yes | No | Yes | No | No |
| Helpdesk admin | Yes | No | Yes | No | No |

As depicted in table 1, the user types and parameters associated with the user types can be extended to a few basic user types used in previous access control mechanisms to many different user types having a variety of granularized permissions. Table 1 illustrates which user types are internal to tenants and the level of type of access control (e.g., resource-based, time-based, role-based and task-based) associated with each user type.

A new role may be added to the role-permission map by utilizing an admin UI screen 232 of a tenant admin UI application via an administrator device 230 to submit a new feature request. A resource administrator may receive and examine the request and if approved, may create a new role in the active directory of the service provider. The resource administrator may first grant read only access to the new role for the tenant admin site. The new role may then be mapped to available tasks in the resource admin center. A series of quality control actions such as security review, experience review, performance and reliability review and accessibility review may then be undertaken to ensure the new role is secure and functions properly.

Once the role-to-permission map 216 is created, a role-bootstrap module 212 may be utilized to examine the role-to-permission map 216 and identify a user's role, admin units the user belongs to, and the tasks the user has access to, when an access request is received from a user device 220 or an administrator device 230. In some implementations, the role-to-permission map 216 utilizes an identification token or access token to identify one or more roles assigned to the user who is requesting access. The role may be stored in a specific field of the token. In an example, the user's role is stored in a well-known identifier (WID) field of the token. The WID field may contain multiple identifiers for a user and may indicate if the user is a delegated admin from a partner organization (e.g., partner tenancy). As a result, a tenant admin's role may be identified from the token. This may be referred to as token-based role bootstrapping. In some implementations, an active directly may store a list of WIDs for roles associated with the active directory.

The asset access module 214 may be used to utilize the information provided by the role-bootstrap module 212 to check and authorize a user's access to the resource 162 at an object model layer at runtime, based on the permissions identified by the role-to-permission map 216. The object model layer may be the layer where authorization control occurs. By providing the role permissions for a user to the object model layer, the object model layer can authorize the user for tasks they are authorized to have access to. This provides added granular permission check at various tenant admin object model layers.

In some implementations, to enable GDAP access control, a user type in the role-to-permission map 216 is indicated as being a GDAP user. To provide access to the GDAP user, the token associated with the user may also contain a specific granular delegated identifier (GUID) in the WID field to indicate the user is a GDAP user. With the user's roles parsed from the ID token, the object model API can match the role with GUID to the role definition and allow access accordingly.

Figure 3:
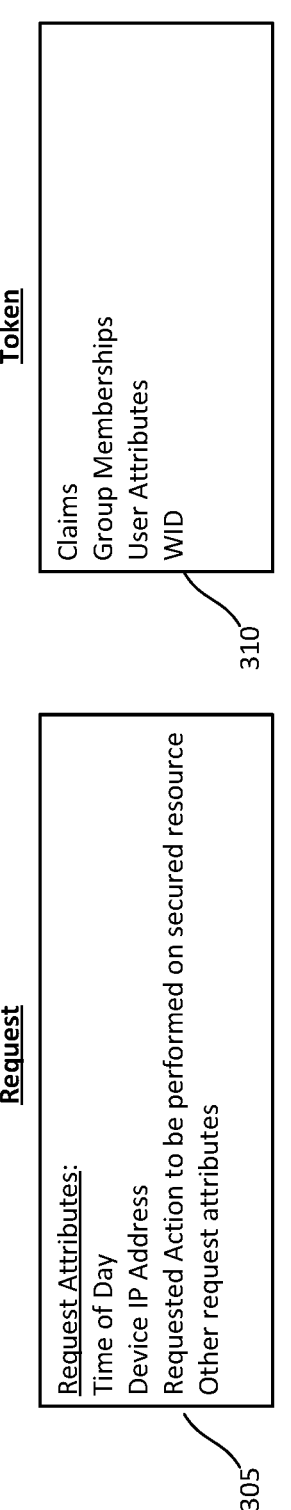
FIG. 3 is a diagram showing details of an example request and token.

FIG. 3 shows an example request 305 and token 310 sent with the request 305 to solicit access to a resource. The request 305 may indicate one or more actions that the user of the user device has requested be performed on the resource. The request 305 may also include additional request attributes that may be used to determine whether the user is authorized to access the resource. The request attributes may include information about the user device, such as but not limited to a network address of the user device, the version of the operating system or other software on the user device, and/or other information related to the user device. The request attributes may also include a timestamp indicating when the request was sent by the user device. The request information may also include other information associated with the request that may be used by the resource provider to determine whether the user has access to the resource.

The token 310 may be an access token provided with the request 305. The token 310 may be implemented as a JSON web token. The token 310 may be generated by an authentication server or service (not shown) such as an active directory (e.g., Azure Active Directory) that verifies the identity of the of user. The token 310 may be provided to the user device by the authentication server or service, and the user device may in turn provide the token 310 to the server associated with the resource (e.g., resource provider server) with the request to authenticate the user to the resource.

The token 310 may include information such as but not limited to access control group memberships of the user, user attributes associated with the user, claims information, and the user's roles as stored in the WID field. The claims information may provide assertions about the user to the resource server. For example, the claims information may include key-value pairs that relay information about the user and the token. The information included in the token may be used by the role-bootstrap module 212 to validate the token and determine whether the user has been authenticated. The claims of token 310 may include information indicating when the token 310 was generated and the security server or service that generated the token 310. The claims may also include group membership information that indicates to which access control groups associated with the resource the user making the request 305 belongs. When the user's role is a GDAP role, the token may also include time restriction information (e.g., for how long the user is allowed to have access to the resource). The information included in the token 310 may be used to determine that the user has been authenticated.

Figure 4A:
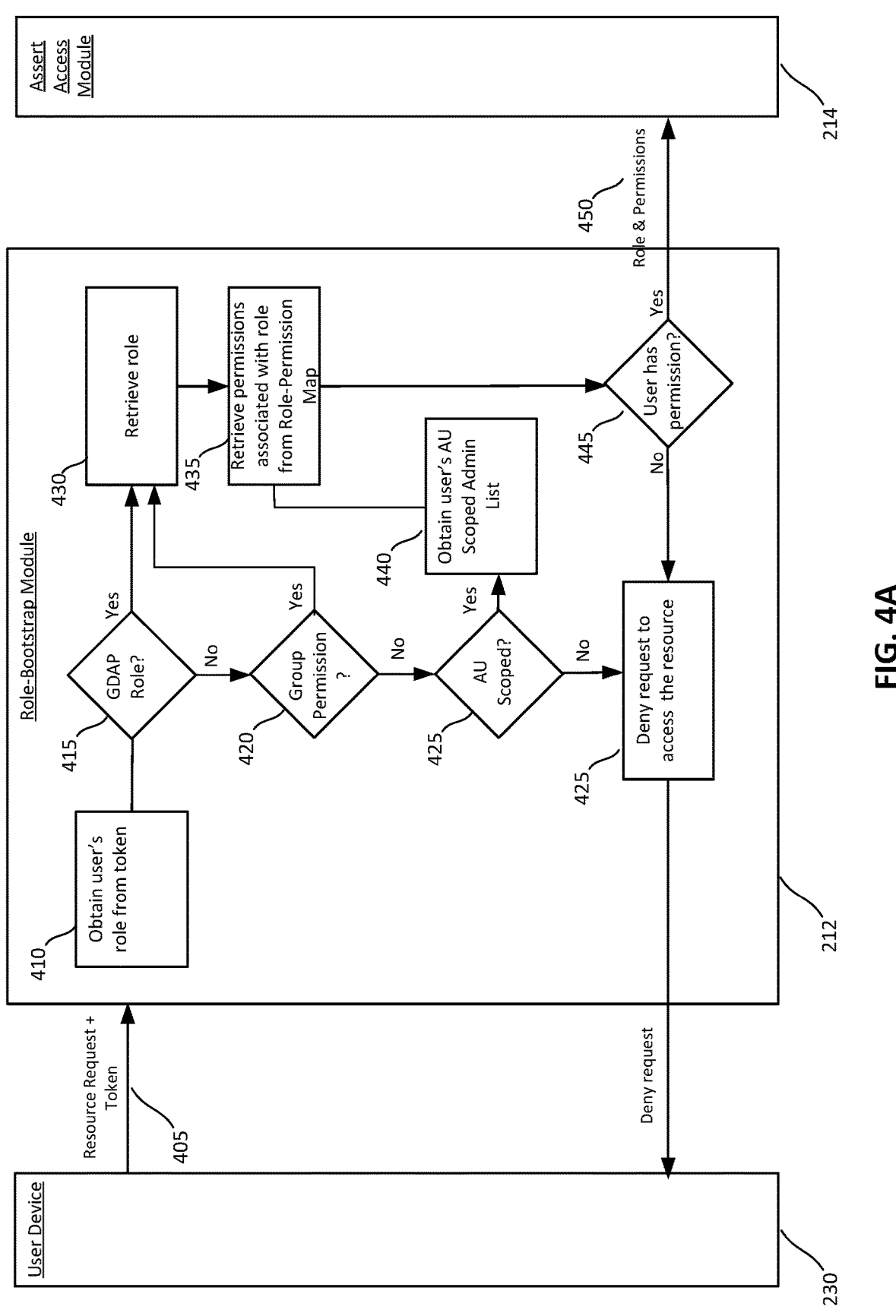
FIG. 4A-4B are diagrams showing additional details of operations that may be performed by a role-based access control manager.
Figure 4B:
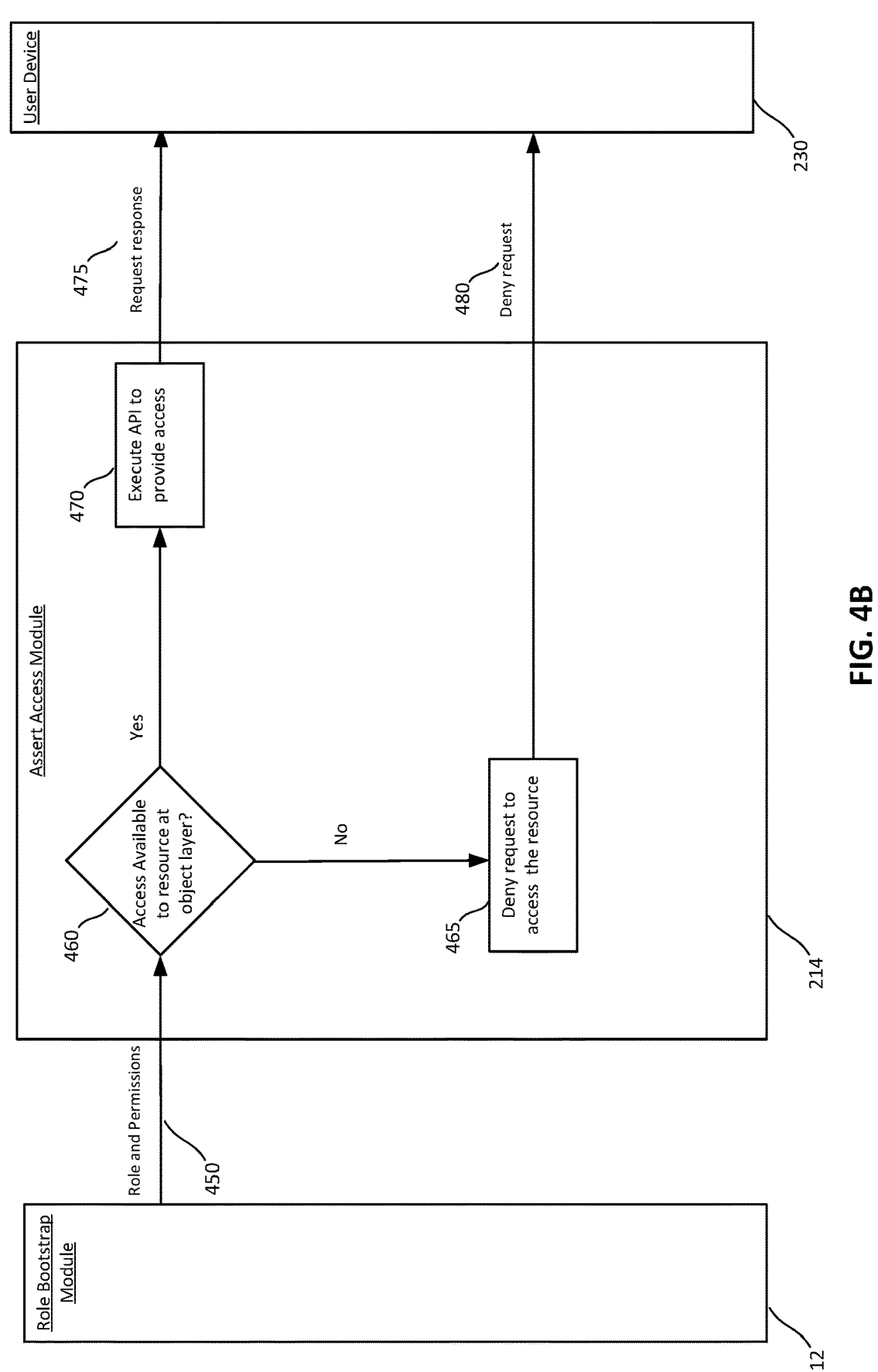

FIGS. 4A-4B are diagrams showing additional details of operations that may be performed by a role-based access control manager. As depicted in FIG. 4A, the administrator device 230 may submit a resource request and a token 405 to a resource server associated with a resource (e.g., resource 162). Upon receipt, the request may be transmitted to the role-bootstrap module 212 of the role-based access control manager 210 to (1) determine whether the user submitting the request is authorized to access the resource, and (2) if the user has access to the resource, determine whether the user has the rights required to perform a requested action or actions on the secured resource. The request may be similar to the request 305 shown in FIG. 3 and the token may be similar to the token 310 shown in FIG. 3. The request may indicate one or more operations requested to be performed on the resource on behalf of the user of the administrator device 230.

Upon receiving the request and token, the role-bootstrap module 212 may perform an operation 410 to obtain the user's role from the token. This may be done by extracting data from the WID field of the token. The role may be any user role allowed in the system under the access control policies of the resource provider. Once the role is determined from the token, the role-bootstrap module 212 may perform an operation 415 to determine if the user is a GDAP type of user and to identify the user's role. When the role-bootstrap module 212 determines that the user is not a GDAP user, the role-bootstrap module 212 may proceed to perform an operation 420 to determine if the user is associated with a group permission. When the user is identified as being a GDAP user or being associated with a group permission, the role-bootstrap module 212 may perform an operation 430 to retrieve the user's role, either from the token or from the group permission.

When it is determined that the user's role is not a GDAP role or a role associated with a group permission, the role-bootstrap module 212 may perform an operation 425 to determine if the role is an admin unit scoped role. If the role-bootstrap module 212 determines that the role is an admin unit scoped role, it may proceed to perform an operation 440 to obtain the user's admin unit scoped admin list from an active directory. This may be done by utilizing a graph API query. After retrieving the user's role at operation 430 or obtaining the user's admin unit scoped admin list at operation 440, the role-bootstrap module 212 may perform an operation 435 to retrieve permissions associated with the identified user role from the role-to-permission map.

Upon retrieving the user's permissions from the role-to-permission map, the role-bootstrap module 212 may proceed to determine, at operation 445, if the user has the required permissions to access the resource and perform the requested action on the resource. When the user is identified as having the required permissions, the role and permissions information 450 may be sent to the asset access module 214 for further processing. When, however, the user is determined as not being authorized to access the resource or not having the requested permissions, then the role-bootstrap module 212 may perform an operation 425 to deny the request to access the resource. A request denied message may then be sent to the administrator device 230 to notify the user.

FIG. 4B depicts example operations that may be performed by the asset access module 214 of the role-based access control manager. When a user is determined as being authorized and having the requested permissions to access the requested resource, the roles and permissions 450 may be transmitted to the assert access module 214. In some implementations, the roles and permissions are determined by allowing the object model layer to access the same role-to-permissions map to determine the permissions for a given user role. The asset access module 214 may perform an operation 460 to determine if access to manage the type of resource the object model is managing is allowed. When the assert access module 214 determines that the user has the requested access, the asset access module 214 proceeds to execute the required API, at operation 470, to provide access to the administrator device 230. A request response 475 may then be transmitted to the user device to confirm that the request has been granted. When, however, it is determined, at operation 460, that access to manage the type of resource requested is not available at the object layer, then the asset control module performs an operation 465 to deny the access to the resource. A deny request message 480 may then be transmitted to the user device to notify the user that access has been denied.

Figure 5:
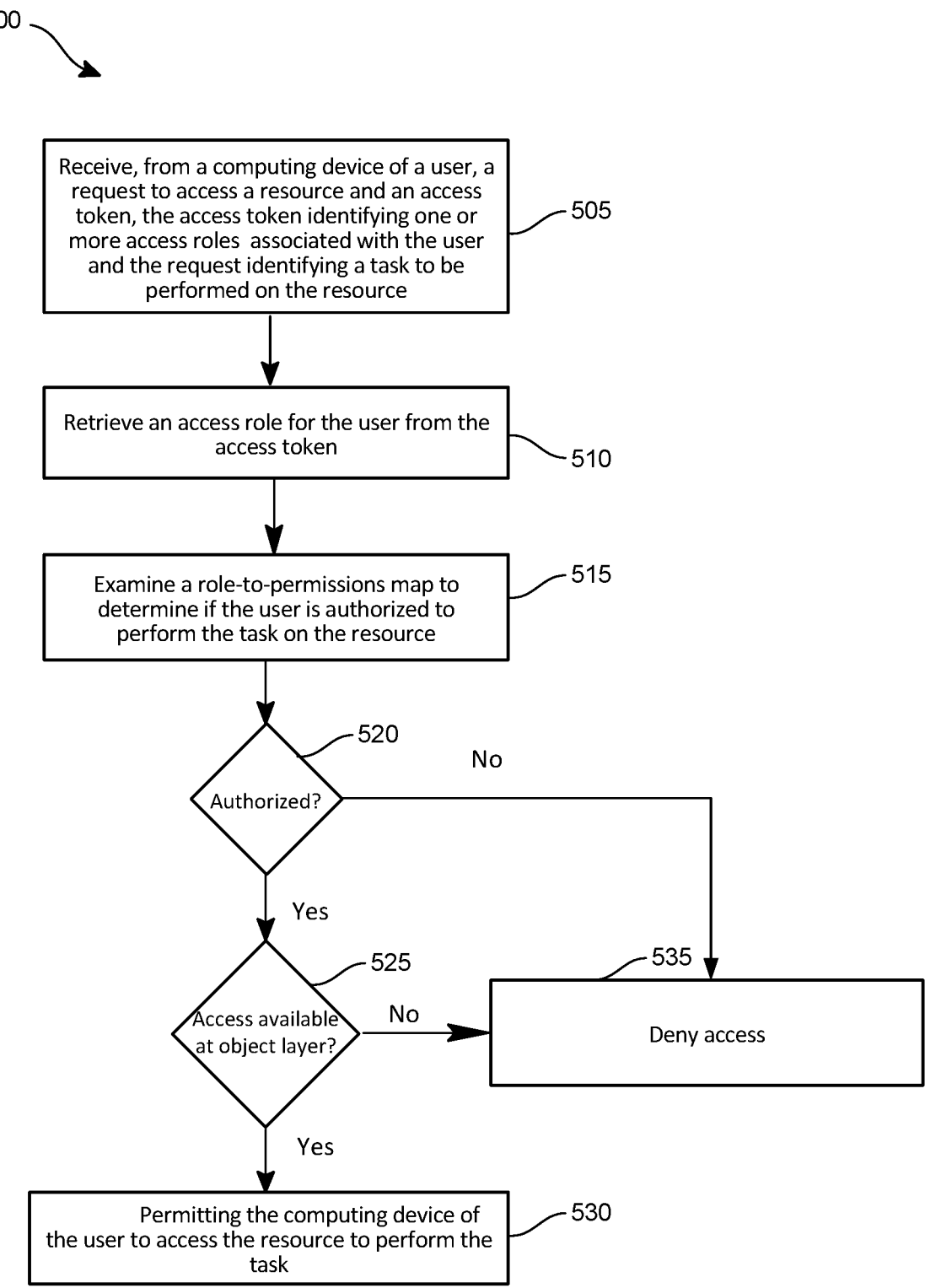
FIG. 5 is a flow diagram depicting an example method for decompressing application files in one or more languages.

FIG. 5 is a flow diagram depicting an example method 500 for processing a request to access a resource using a granular access control mechanism. The steps of method 500 may be performed by an access control element such as the access control element 164 of FIG. 1. At 505, method 500 may begin by receiving from a computing device of a user a request to access a resource and an access token. The request may identify a task the user desires to perform on the resource (e.g., a CRUD operation). The token may be an access token that includes a field for identifying the requesting user's role in the computing environment and/or the requesting user's role with respect to the resource. The token may be issued by a secure token service by examining an active directory list.

After receiving the request, method 500 may proceed to retrieve the access role for the user from the access token, at 510. This may be done by examining a specific field of the access token (e.g., WID field) to extract the access role. Once the access role is retrieved, method 500 may proceed to examine a role-to-permissions map to determine if the user is authorized to perform the requested task on the requested resource based on the user's role and the permissions available for that role, at 515. For example, if the identified user role is a global admin role, examining the role-to-permissions map may show that the user is allowed to perform all CRUD operations on the resource. If the user's role is a global reader, however, examining the role-to-permissions files may demonstrate that the user is only allowed to perform read operations on the resource.

Upon examining the role-to-permissions map, method 500 may proceed to determine, at 520, if the user is authorized to perform the requested task on the requested resource. When the user is determined to be authorized, method 500 may proceed to determine if the user has access to manage the type of resource the object layer is managing, at 525. This may be performed by an asset access module such as the asset access module 214 of FIG. 2. When it is determined that the user is not authorized to perform the requested task on the requested resource, at 520, or it is determined that the user does not have access to manage the type of resource the object layer is managing, at 525, method 500 may proceed to deny access to the user, at 535. This may be achieved by transmitting an access denied message to the computing device of the user requesting access. If it is determined, however, that the user has access to manage the type of resource the object layer is managing, at 525, then method 500 may proceed permit the computing device of the of the requesting user to access the resource and perform the requested task, at 530.

In this manner, the instant disclosure provides an access control mechanism that offers a single role-to-permission map designed with granular resource control for both the backend and frontend to enforce access control check, adds an access control layer in the backend, and improves API security.

Figure 6:
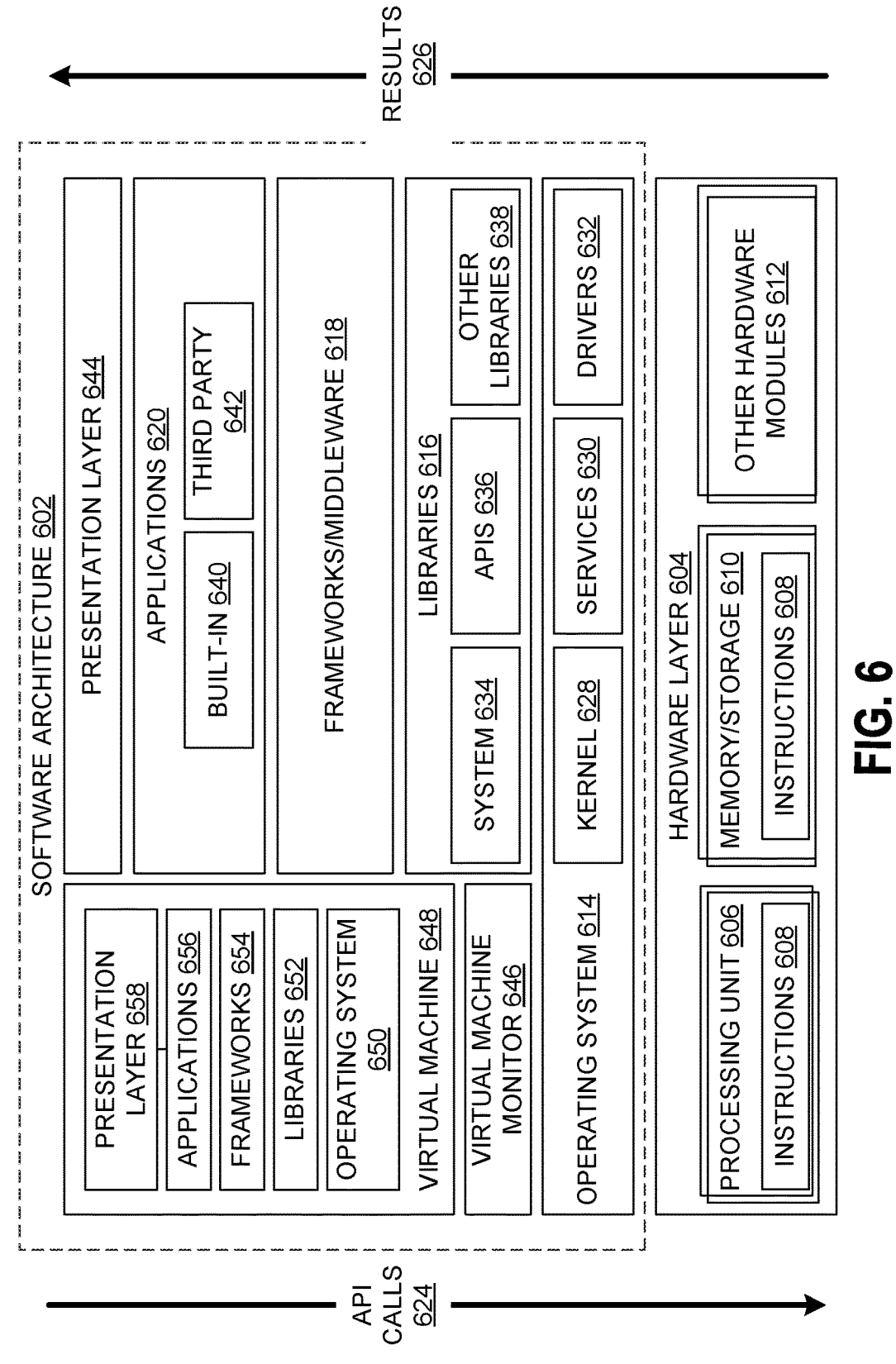
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 624 to create user interfaces to interact with users.

Some software architectures use virtual machines, as illustrated by a virtual machine 628. The virtual machine 628 provides an execution environment where applications/modules can execute as if they were executing on a hardware machine (such as the machine 600 of FIG. 6, for example). The virtual machine 628 may be hosted by a host OS (for example, OS 614) or hypervisor, and may have a virtual machine monitor 646 which manages operation of the virtual machine 628 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
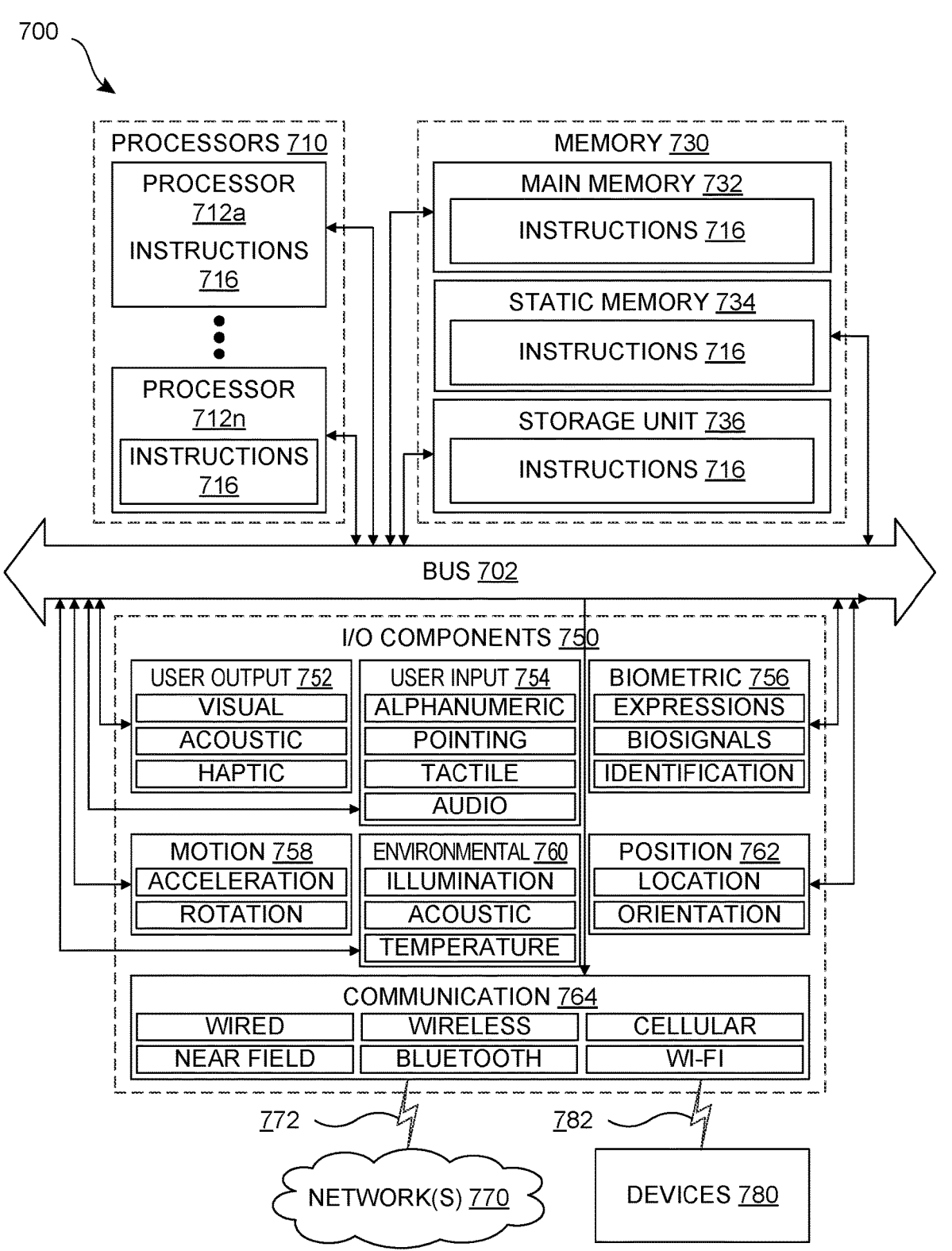
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IOT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof.

Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
   a processor; and
   a memory in communication with the processor, the memory comprising executable instructions that, when executed by, the processor, cause the data processing system to perform functions of:
      receiving, from a user's device, a request to access a resource and an access token, the access token identifying an access role associated with a user and the request identifying a task to be performed on the resource;
      retrieving the access role from the access token;
      examining a role-to-permissions map to identify one or more permissions available for the access role;
      determining, based on the available one or more permissions for the access role that the user is authorized to perform the task on the resource;
      determining, based on the access role and the available one or more permissions, that the user has permission to access the resource managed by an object model; and
      upon determining that the user is authorized to perform the task on the resource and that the user has permission to access the resource managed by the object model, permitting the user's device to access the resource to perform the task.

Item 2. The data processing system of item 1, wherein retrieving the access role from the access token, examining the role-to-permissions map, and determining that the user is authorized to perform the task on the resource is done by a roll-based access control manager.

Item 3. The data processing system of item 2, wherein the roll-based access control manager utilizes a role-bootstrap module.

Item 4. The data processing system of any preceding item, wherein the access token includes a field for storing the access role.

Item 5. The data processing system of any preceding item, wherein the field is a well-known identifier (WID) field.

Item 6. The data processing system of item 5, wherein a granular delegated identifier GUID in the WID field indicates that the user has Granular Delegated Admin Permission.

Item 7. The data processing system of any preceding item, wherein the access role associated with the user includes an admin unit role.

Item 8. The data processing system of item 7, wherein the admin unit role is resource scoped.

Item 9. A method for providing access to a resource comprising:

receiving, from a user's device, a request to access the resource and an access token, the access token identifying an access role associated with a user and the request identifying a task to be performed on the resource;

retrieving the access role from the access token;

examining a role-to-permissions map to identify one or more permissions available for the access role;

determining, based on the available one or more permissions for the access role, that the user is authorized to perform the task on the resource;

determining, based on the access role and the available one or more permissions, that the user has permission to access the resource managed by an object model; and upon determining that the user is authorized to perform the task on the resource and the user has permission to access the resource managed by the object model, permitting the user's device to access the resource to perform the task.

Item 10. The method of item 9, wherein retrieving the access role from the access token, examining the role-to-permissions map, and determining that the user is authorized to perform the task on the resource is done by a roll-based access control manager.

Item 11. The method of items 9 or 10, wherein the access token includes a field for storing the access role.

Item 12. The method of item 11, wherein the field is a well-known identifier (WID) field.

Item 13. The method of item 12, wherein a granular delegated identifier GUID in the WID field indicates that the user has Granular Delegated Admin Permission.

Item 14. The method of any of items 9-13, wherein the access role associated with the user includes an admin unit role.

Item 15. The method of item 14, wherein the admin unit role is resource scoped.

Item 16. A non-transitory computer readable medium on which are stored instructions that, when executed, cause a programmable device to perform functions of:

receiving, from a use's device, a request to access a resource and an access token, the access token identifying an access role associated with a user and the request identifying a task to be performed on the resource;

retrieving the access role from the access token;

examining a role-to-permissions map to identify one or more permissions available for the access role;

determining, based on the available one or more permissions for the access role, that the user is authorized to perform the task on the resource;

determining, based on the access role and the available one or more permissions, that the user has permission to access the resource managed by an object model; and upon determining that the user is authorized to perform the task on the resource and that the user has permission to access the resource managed by the object model, permitting the user's device to access the resource to perform the task.

Item 17. The computer readable medium of item 16, wherein retrieving the access role from the access token, examining the role-to-permissions map, and determining that the user is authorized to perform the task on the resource is done by a roll-based access control manager.

Item 18. The computer readable medium of claim 16, wherein the access token includes a well-known identifier (WID) field for storing the user role.

Item 19. The computer readable medium of claim 18, wherein a granular delegated identifier GUID in the WID field indicates that the user has Granular Delegated Admin Permission.

Item 20. The computer readable medium of claim 16, wherein the access role associated with the user may include an admin unit role.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system for providing access to a resource hosted by a resource provider, the resource allocated to a tenant customer of the resource provider and the resource managed by a partner organization of the tenant customer or the resource provider, the data processing system comprising:
  a processor; and
  a memory in communication with the processor, the memory comprising executable instructions that, when executed by the processor, cause the data processing system to perform functions of:
    receiving, from a user at the partner organization, an access request and a token, the access request indicating a task to be performed on the resource by the user, and the token including data indicating an access role granted to the user by the tenant customer from amongst a plurality of possible access role types including a granular delegated access role, where the granular delegated access role indicates access to the resource is subject to an added granular permission check;
    determining that the access role is a granular delegated access role;
    in response to determining that the access role is a granular delegated access role, performing the added granular permission check including mapping the access role with a role-to-permission map to determine one or more permissions available to the user;
    authorizing the task based on an object model and the one or more permissions; and
    in response to the authorization, permitting the user to perform the task on the resource.

2. The data processing system of claim 1, wherein retrieving the access role from the access token, examining the role-to-permissions map, and determining that the user is authorized to perform the task on the resource is done by a role-based access control manager.

3. The data processing system of claim 2, wherein the role-based access control manager utilizes a role-bootstrap module.

4. The data processing system of claim 1, wherein the access token includes a field for storing the access role.

5. The data processing system of claim 4, wherein the field is a well-known identifier (WID) field.

6. The data processing system of claim 5, wherein a granular delegated identifier GUID in the WID field indicates that the user has Granular Delegated Admin Permission.

7. The data processing system of claim 1, wherein an organization of the tenant customer is divided into a plurality of tenant departments, the access role granted to the user includes an admin unit role corresponding to a tenant department.

8. The data processing system of claim 7, wherein the resource allocated to the tenant customer is divided into portions each associated with one or more of the tenant departments, the admin unit role is resource scoped to a particular portion associated with the tenant department corresponding to the admin unit role.

9. The data processing system of claim 1, wherein the tenant customer includes a plurality of tenant subunits, the task is associated with a first of the tenant subunits, and the authorizing the task based on the object model includes determining whether the access role permits the task associated with the tenant subunit.

10. The data processing system of claim 1, wherein in response to determining that the access role is a granular delegated access role, the permitting the user to perform the task is restricted based on a time restriction included in the token.

11. A method for providing access to a resource hosted by a resource provider, the resource allocated to a tenant customer of the resource provider and the resource managed by a partner organization of the tenant customer or the resource provider, the method comprising:
  receiving, from a user at the partner organization, an access request and a token, the access request indicating a task to be performed on the resource by the user, and the token including data indicating an access role granted to the user by the tenant customer from amongst a plurality of possible access role types including a granular delegated access role, where the granular delegated access role indicates access to the resource is subject to an added granular permission check;
  determining that the access role is a granular delegated access role;
  in response to determining that the access role is a granular delegated access role, performing the added granular permission check including mapping the access role with a role-to-permission map to determine one or more permissions available to the user;
  authorizing the task based on an object model and the one or more permissions; and
  in response to the authorization, permitting the user to perform the task on the resource.

12. The method of claim 11, wherein retrieving the access role from the access token, examining the role-to-permissions map, and determining that the user is authorized to perform the task on the resource is done by a role-based access control manager.

13. The method of claim 11, wherein the access token includes a field for storing the access role.

14. The method of claim 13, wherein the field is a well-known identifier (WID) field.

15. The method of claim 14, wherein a granular delegated identifier GUID in the WID field indicates that the user has Granular Delegated Admin Permission.

16. The method of claim 11, wherein the access role assigned to the user includes an admin unit role.

17. The method of claim 16, wherein the admin unit role is resource scoped.

18. A non-transitory computer readable medium on which are stored instructions for providing access to a resource hosted by a resource provider, the resource allocated to a tenant customer of the resource provider and the resource managed by a partner organization of the tenant customer or the resource provider, wherein the instructions, when executed, cause a programmable device to perform functions of:

receiving, from a user at the partner organization, an access request and a token, the access request indicating a task to be performed on the resource by the user, and the token including data indicating an access role granted to the user by the tenant customer from amongst a plurality of possible access role types including a granular delegated access role, where the granular delegated access role indicates access to the resource is subject to an added granular permission check;

determining that the access role is a granular delegated access role;

in response to determining that the access role is a granular delegated access role, performing the added granular permission check including mapping the access role with a role-to-permission map to determine one or more permissions available to the user;

authorizing the task based on an object model and the one or more permissions; and in response to the authorization, permitting the user to perform the task on the resource.

19. The computer readable medium of claim 18, wherein retrieving the access role from the access token, examining the role-to-permissions map, and determining that the user is authorized to perform the task on the resource is done by a role-based access control manager.

20. The computer readable medium of claim 18, wherein the access token includes a well-known identifier (WID) field for storing the access role.

<div align="center">*   *   *   *   *</div>